United States Patent [19]
Sutliff et al.

[11] Patent Number: 5,584,723
[45] Date of Patent: Dec. 17, 1996

[54] RECHARGEABLE BATTERY ASSEMBLY

[75] Inventors: James W. Sutliff, Remsen; Dallas W. Jones, New Hartford, both of N.Y.

[73] Assignee: Trim-a-Lawn Corporation, Rome, N.Y.

[21] Appl. No.: 153,745

[22] Filed: Nov. 17, 1993

[51] Int. Cl.⁶ .................................................... H01M 2/30
[52] U.S. Cl. ........................ 439/500; 439/660; 439/840
[58] Field of Search ................................. 439/500, 660, 439/627, 840, 929, 699.1, 374; 320/2

[56] References Cited

U.S. PATENT DOCUMENTS

| | | | |
|---|---|---|---|
| 825,882 | 7/1906 | Harper | 439/627 |
| 1,392,558 | 10/1921 | Darrah et al. | 439/289 |
| 2,284,462 | 5/1942 | Williams | 439/345 |
| 2,825,799 | 3/1958 | Julien | 439/929 |
| 3,411,130 | 11/1968 | Bushey | 439/660 |
| 3,973,179 | 8/1976 | Weber | 320/2 |
| 4,431,245 | 2/1984 | Jigamian | 439/929 |
| 4,578,628 | 3/1986 | Siwiak | 320/2 |
| 5,187,422 | 2/1993 | Izenbaard et al. | 320/2 |

FOREIGN PATENT DOCUMENTS

813559  3/1981  U.S.S.R. .

*Primary Examiner*—Neil Abrams
*Attorney, Agent, or Firm*—Heslin & Rothenberg, P.C.

[57] ABSTRACT

The invention provides a connection assembly for a rechargeable battery, including a connector and connector receptacle assembly to connect the battery to the device. The connection assembly allows a battery to be inserted and removed from the device with minimal effort for recharging or use. The connector includes an insulator block with positive and negative electrical contact plates mounted therein, which contact the respective positive and negative contact plates of the connector receptacle. The connector is mounted to a battery, and the connector receptacle is mounted to an electrical device, such as a lawn mower or a charge unit if recharging is desired.

51 Claims, 10 Drawing Sheets fig. 1 fig. 2 fig. 3 fig. 4 fig. 5 fig. 6 fig. 10 fig. 11 fig. 12 fig. 13 fig. 14 fig. 15 fig. 16

5,584,723

RECHARGEABLE BATTERY ASSEMBLY

FIELD OF THE INVENTION

This invention relates in general to rechargeable electrically-operated devices, such as lawn mowers, and more particularly to the connections for an easily removable and rechargeable battery for such an electrically-operated device.

BACKGROUND OF THE INVENTION

Gas-powered lawn and garden products, such as lawn mowers, trimmers, and leaf blowers, pose a threat to the environment due to the pollutants they emit during use. Other small gas-powered products, such as chain saws, snowmobiles, and all-terrain vehicles (ATVs), pose the same problem. In response to this threat, some states have passed regulations limiting the emissions allowed from such gas-powered products. This has led to the desire for cleaner-running engines to operate products.

The use of electric motors offers an alternative power source for these products. In addition to addressing the pollution problem, electric motors eliminate the need to store gasoline in a home environment. This cuts down on fire hazards associated with storage of gasoline, as well as gasoline spills which can kill grass and plants and soil clothing. Electric motors also reduce the noise pollution associated with small gasoline engines.

One example of electrically-operated products which have been developed are electric lawn mowers. These electric lawn mowers operate with an extension cord to tap into household electricity sources. These mowers require the dragging of electrical cords and restrict the operation of the mowers to areas within the reach of an electrical outlet. Furthermore, electric mowers pose the risk of the accidental cutting of the power cord to the mower, which can result in serious or fatal injuries due to electrical shock.

Alternatives to electric products operated by electrical cords are thus desirable. One such alternative is a battery-operated product. Current battery-operated products, however, are dependent upon the charge storable in the battery. Typically, a battery will operate for one hour, then the battery must be recharged. The recharge time is between 12–24 hours, which presents problems for finishing a job promptly. For example, many people mow their lawn on weekends. An operator may begin mowing a lawn on Sunday, only to run out of charge prior to completing the project. By the time the battery is recharged 12–24 hours later, the work week has begun and it may not be convenient to finish mowing the lawn.

A need continues to exist, therefore, for a clean-running engine or motor that addresses the problems of small gasoline engines, electric motors, and battery-operated products.

SUMMARY OF THE INVENTION

It is thus an object of the subject invention to provide a product that is operated by a clean-running motor. The clean-running motor according to the subject invention is battery-operated.

It is a further object of the subject invention to provide a battery-operated device that is easily operated and easily recharged without interfering with completion of work projects.

In accordance with these objectives, the invention provides a connection of a rechargeable battery to a device which allows the operator to easily remove one battery that has spent its charge and replace it with a fully charged battery. Furthermore, when the rechargeable battery is not in use, it can be easily recharged and stored fully charged while awaiting its next use.

The main components of the connection assembly of the subject invention include a connector which is mountable to a rechargeable battery power source and a connector receptacle mountable to a device. The device can be an appliance to be operated by the rechargeable battery power source or a recharger unit which will restore charge to the rechargeable battery. The connection assembly is the same whether the battery is being charged or discharged. The difference is where the connector receptacle is mounted.

The connector is mounted to the rechargeable battery so that the connector is in electrical contact with the positive and negative terminals of the battery, and the connector receptacle is mounted to the device so that the receptacle is in electrical contact with the device. When the connector is placed within the connector receptacle, the connector aligns with the connector receptacle so that an electrical connection between the rechargeable battery and the device is completed. An appliance can then be operated by the rechargeable battery power source, or the battery can be recharged.

By the use of the connector and connector receptacle, a rechargeable battery can easily be inserted and removed from an appliance, for use and convenient recharging. A second rechargeable battery with a like connector mounted thereon can easily be inserted into the connector receptacle of the appliance when the first rechargeable battery is drained of charge. The drained battery can be placed in an electrical charger unit for recharging while the second battery is being used. Thus, the connection assembly overcomes the problem of prior battery-operated devices in which timely completion of a work project was limited by the amount of time a single, not easily removable battery could maintain its charge.

The main components of the connector according to the subject invention include an insulator block, such as a plastic block, into which are mounted a positive electrical contact plate and a negative electrical contact plate. Means are also provided for electrically connecting the positive electrical contact plate to the positive terminal of a rechargeable battery power source, and for electrically connecting the negative electrical contact plate to the negative terminal of the battery.

The main components of the connector receptacle according to the subject invention include an insulator block, such as a plastic block, to which are attached a positive contact and a negative contact. Means are also provided for electrically contacting the positive contact and the negative contact to the device.

In regard to the connector, means are also provided for mounting the connector to the rechargeable battery so that the positive terminal of the battery is electrically connected to the positive electrical contact plate of the connector, and so that the negative terminal of the battery is electrically connected to the negative electrical contact plate of the connector. In regard to the connector receptacle, means are provided for mounting the connector receptacle to the device so that the positive contact and negative contact are electrically connected to the device. Accordingly, when the connector of the battery is inserted into the connector receptacle of the device, the positive and negative terminals of the battery electrically connect to the positive and negative electrical contact plates, which in turn electrically connect to the positive and negative contacts of the receptacle, respectively, which in turn electrically connect with the device. The electrical connection between the rechargeable battery and the device is thus completed or broken simply by inserting or removing the connector from the connector receptacle, i.e. by inserting or removing the rechargeable battery from the device.

The use of the connection assembly thus results in a rechargeable battery assembly of the subject invention which includes a rechargeable battery, a connector mounted to the battery in electrical contact with the positive and negative terminals of the battery, a device into which the rechargeable battery will be inserted, and a connector receptacle mounted to the device in electrical contact therewith. As discussed above, when the connector (mounted to the battery) is inserted into the connector receptacle (mounted to the device), the connector aligns with the connector receptacle such that an electrical connection between the battery and the device is completed. Likewise, when the connector is removed from the connector receptacle, the electrical connection is broken.

BRIEF DESCRIPTION OF THE FIGURES

These and other objects, features and advantages of this invention will be evident from the following detailed description of preferred embodiments when read in conjunction with the accompanying drawings in which.

DETAILED DESCRIPTION OF THE INVENTION

Figure 1:
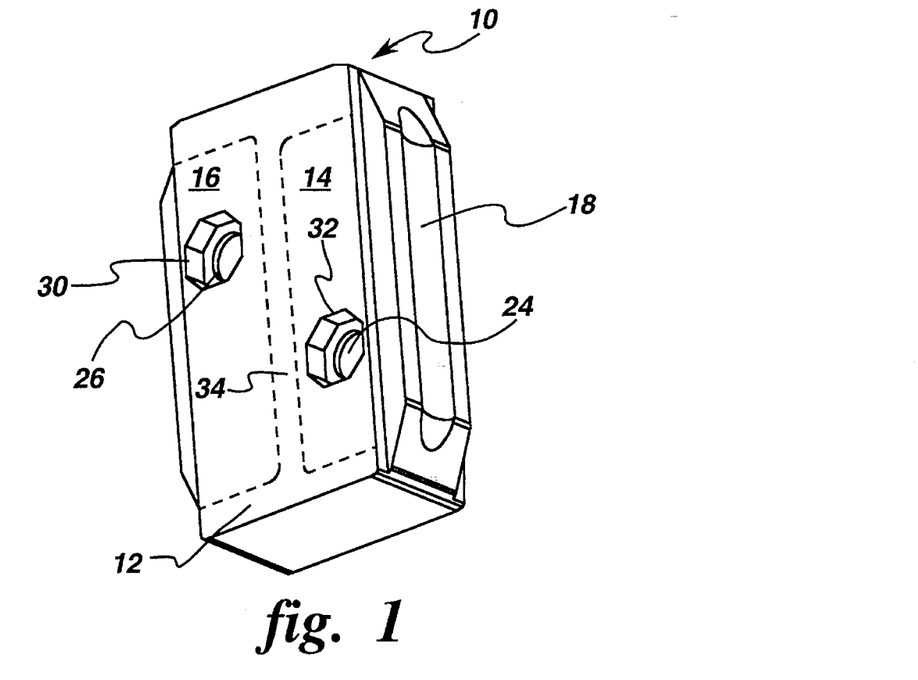
FIG. 1 is a perspective view of a connector according to one embodiment of the subject invention.
Figure 2:
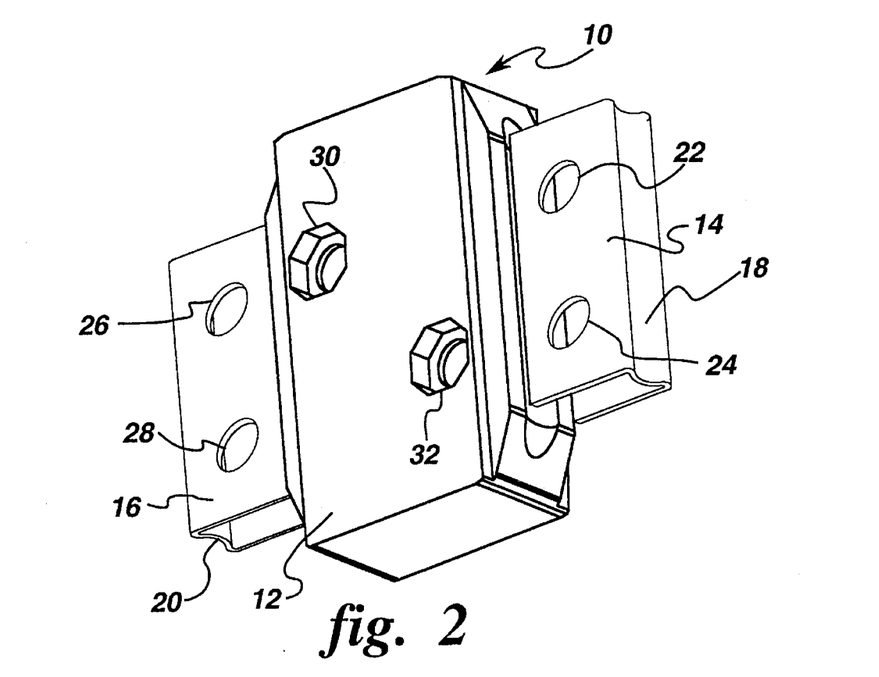
FIG. 2 is an exploded perspective view of the connector shown in FIG. 1.

The main components of one embodiment of the connector of the subject invention are shown in FIGS. 1 and 2. The connector 10 comprises an insulator block 12, preferably of plastic, into which are insert molded a positive electrical contact plate 14 and a negative electrical contact plate 16. The plates are electrically conductive, and are preferably made of metal. They can be coated with an electrically conductive material, such as a beryllium copper alloy. The plates are shown in an exploded view in FIG. 2 to show their structure. The positive electrical contact plate 14 has a recessed area 18, preferably a groove, which is exposed on the exterior of the insulator block 12. The positive electrical contact plate 14 also has two apertures 22 and 24 centered along the longitudinal axis thereof. Likewise the negative electrical contact plate 16 has a recessed area 20, preferably a groove, which is also exposed on the exterior of the insulator block 12 apart from the recessed area 18 of the positive electrical contact plate 14. The negative electrical contact plate 16 also has two apertures 26 and 28 centered along the longitudinal axis thereof. Thus, the two plates are interchangeable to allow for ease in manufacturing of the connector.

When mounted in the insulator block 12, the positive electrical contact plate 14 is electrically isolated from the negative electrical contact plate 16 by an intervening area 34 of the insulator block 12 (shown in phantom in FIG. 1). This intervening area 34 prevents the two plates from electrically connecting which could short out the battery connected thereto. The recessed areas 18 and 20 of the respective plates will provide the means for electrical contact with the connector receptacle.

The insulator block 12 also has offset apertures 30 and 32 counterbored therein which extend completely through the block. These apertures 30 and 32 serve a dual purpose, allowing for the insertion of fastener devices, such as screws, therethrough, through the corresponding contact plate aperture 22, 24, 26 or 28, and into the rechargeable battery to which the connector is mounted. Note that the corresponding aperture 22, 24, 26 or 28 of the contact plates are slightly smaller in diameter and allow the head of the fastener device to rest thereon flush within the insulator block 12 so that no unwanted protrusions extend on the exterior of the insulator block that could interfere with mounting or usage.

The apertures 30 and 32 also provide a means for electrically contacting a portion of the positive electrical contact plate 14 to the positive terminal of a rechargeable battery power source and for electrically contacting a portion of the negative electrical contact plate 16 to the negative terminal of a battery. This electrical contact will be described more fully below. The exposure of the contact plates inside these apertures also helps to prevent accidental contact of the positive plate to the negative plate, since a conductor would need to be inserted into both apertures at the same time, i.e. bent at angles.

Thus, the connector 10 is symmetrical on all axis except for the apertures 30 and 32 therein. This allows for ease in manufacture, while the offset apertures 30 and 32 prevent the accidental connection of a positive terminal of a battery to a negative contact of a device and likewise the accidental connection of the negative terminal of a battery to the positive contact of a device.

Figure 3:
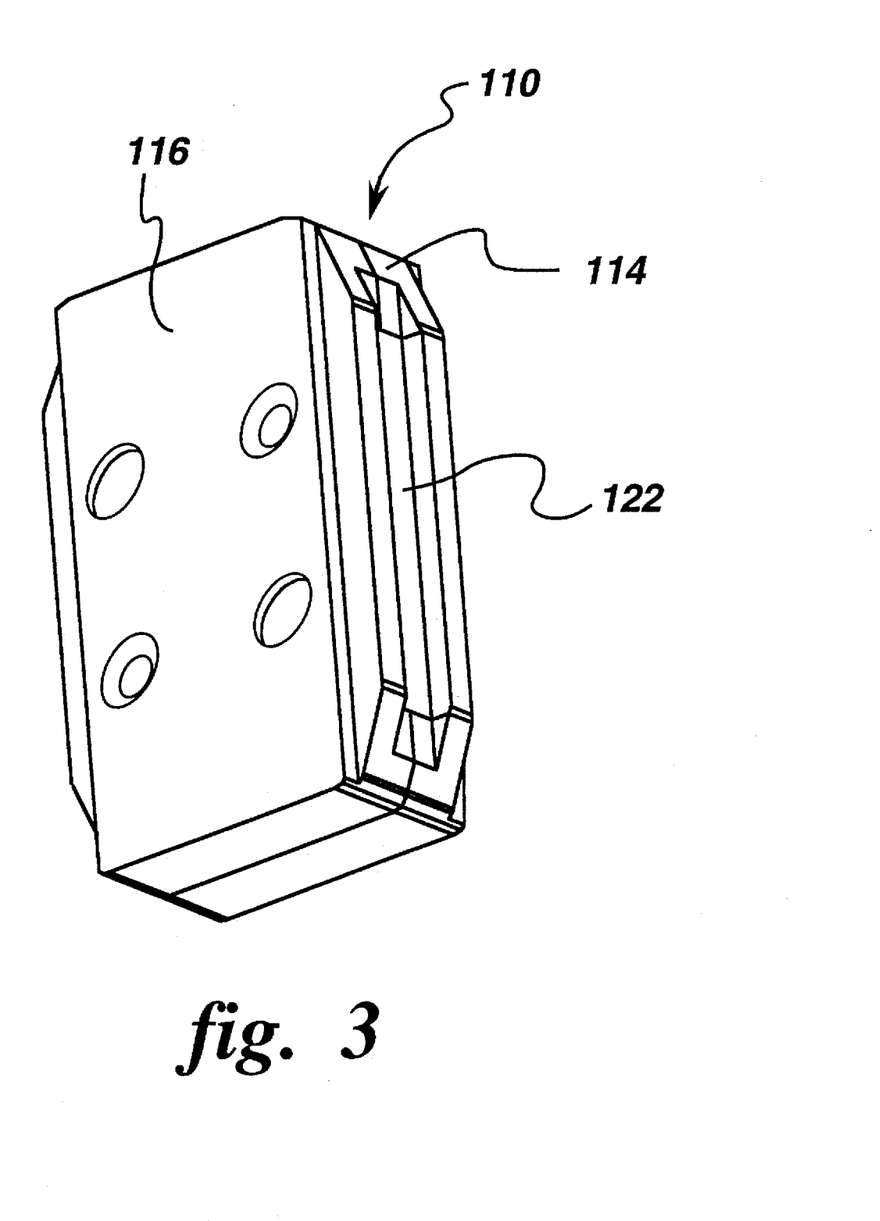
FIG. 3 is a perspective view of a connector according to another embodiment of the subject invention.
Figure 4:
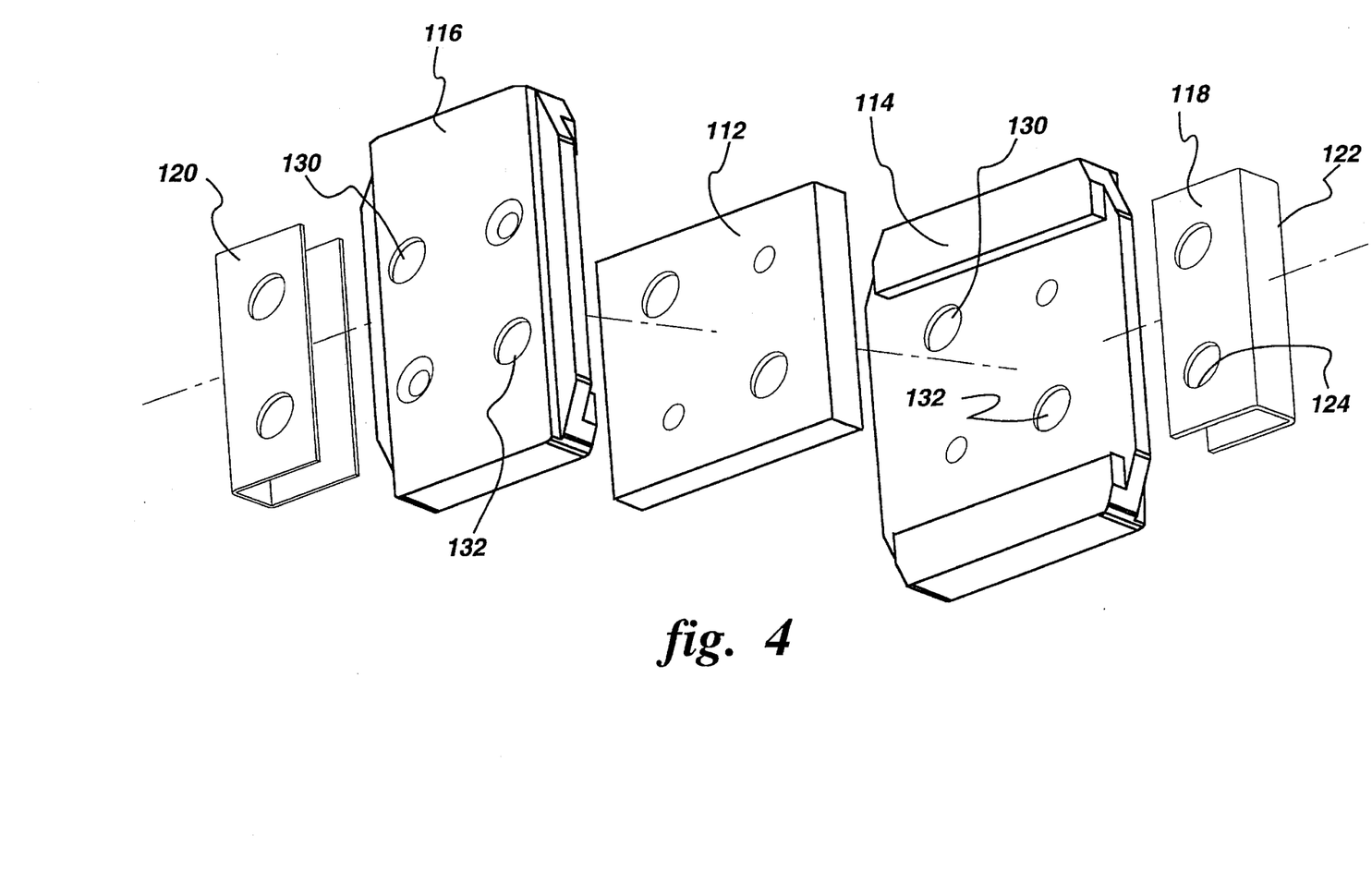
FIG. 4 is an exploded perspective view showing the elements of the connector shown in FIG. 3.

FIGS. 3 and 4 show a further embodiment of the connector according to the subject invention. The components of the connector 110 are the same, except they are manufactured in a manner other than insert molding. The connector 110 has an insulator block made up of a central core 112 and two insulator housing portions 114 and 116. The positive electrical contact plate 118 and the negative electrical contact plate 120 are placed over the central core 112, with the apertures therein aligning. Then the two housing portions 114 and 116 are snapped over the central core/contact plates combination, to provide the connector 110 shown in FIG. 3. The housing portions 114 and 116 each have cut-out side portions to leave an exposed portion 122 of the positive electrical contact plate 118. This exposed portion 122 will be used to contact the device as discussed more fully below. A similar portion of the negative electrical contact plate is also left exposed.

Figure 5:
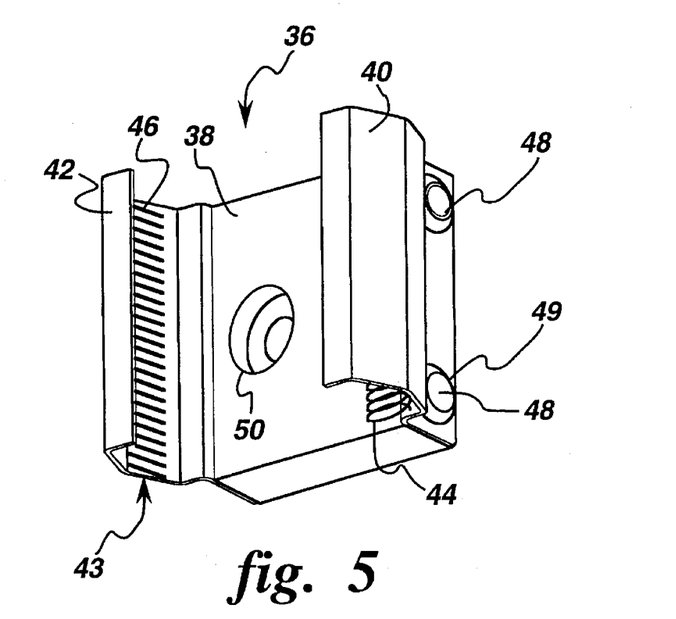
FIG. 5 is a perspective view of a connector receptacle according to one embodiment of the subject invention.
Figure 6:
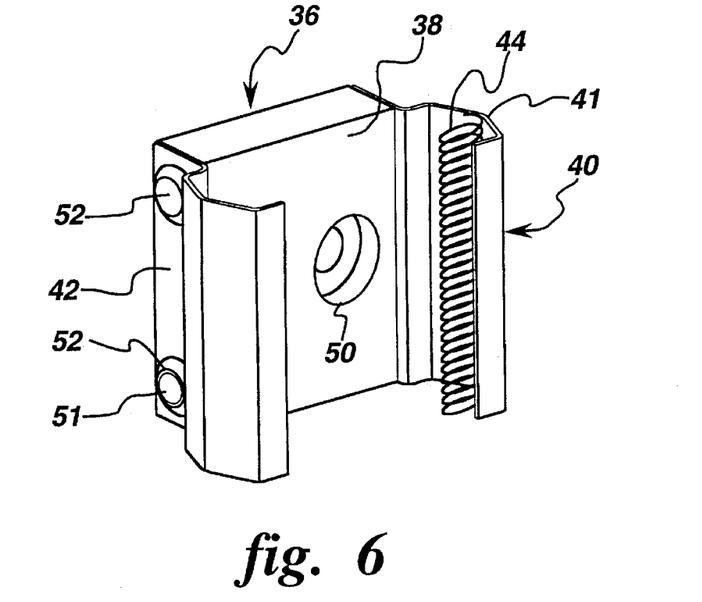
FIG. 6 is another perspective view of the connector receptacle shown in FIG. 5.
Figure 7:
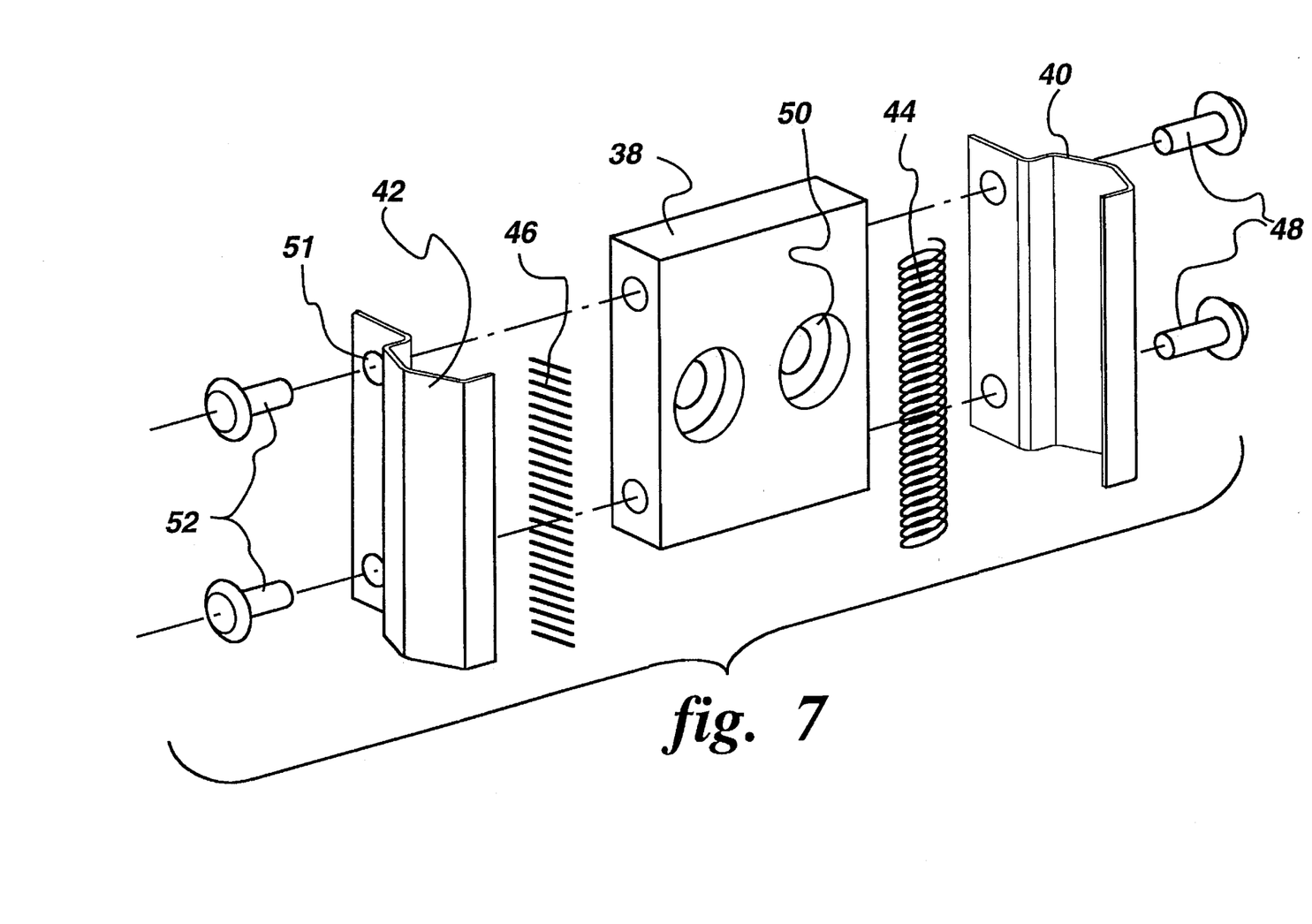
FIG. 7 is an exploded perspective view showing the assembly of the connector receptacle shown in FIG. 5.

Referring now to FIGS. 5–7, the main components of the connector receptacle are shown. FIG. 7 shows the assembly of the elements of the connector receptacle. The connector receptacle 36 comprises an insulator block 38, preferably of plastic, to which are mounted or attached a positive contact 40 and a negative contact 42. The positive contact 40 preferably comprises a flexible electrically conductive element 44 (preferably a flexible metal spring such as a canted coil spring) mounted within an electrically conductive element retainer 41 which is preferably made of metal. The electrically conductive element retainer 41 has a recessed portion into which the flexible electrically conductive element 44 is attached, such as by soldering or crimping. The element retainer 41 is mounted to the insulator block 38 by means of conductive fastener devices 48 which extend through apertures 49 (shown in phantom in FIG. 5) in the element retainer 41 into the insulator block 38. Likewise, the negative contact 42 preferably comprises a flexible electrically conductive element 46 mounted within an electrically conductive element retainer 43. The electrically conductive element retainer 43 has a recessed portion into which the flexible electrically conductive element 46 is preferably soldered or crimped. The element retainer 43 is mounted to the insulator block 38 by means of conductive fastener devices 52 which extend through apertures 51 (shown in phantom in FIG. 6) in the element retainer 43 into the insulator block 38.

The apertures 49 and 51 also provide the means for electrically contacting the element retainers, 41 and 43, respectively, to the device. The positive wiring from the device is connected between the electrically conductive fastener device 48 and the element retainer 41 of the positive contact 40, while the negative wiring from the device is connected between the electrically conductive fastener device 52 and the element retainer 43 of the negative contact 42 (see FIG. 14).

The connector receptacle 36 also has one or more apertures 50 in the insulator block 38 which provide a means for mounting the connector receptacle 36 to a device. These apertures 50 are preferably counterbored so that the mounting of the connector receptacle 36 using fastener devices does not allow the heads of the fastener devices to protrude on the exterior of the insulator block, which could interfere with insertion of the connector into the connector receptacle.

Figure 8:
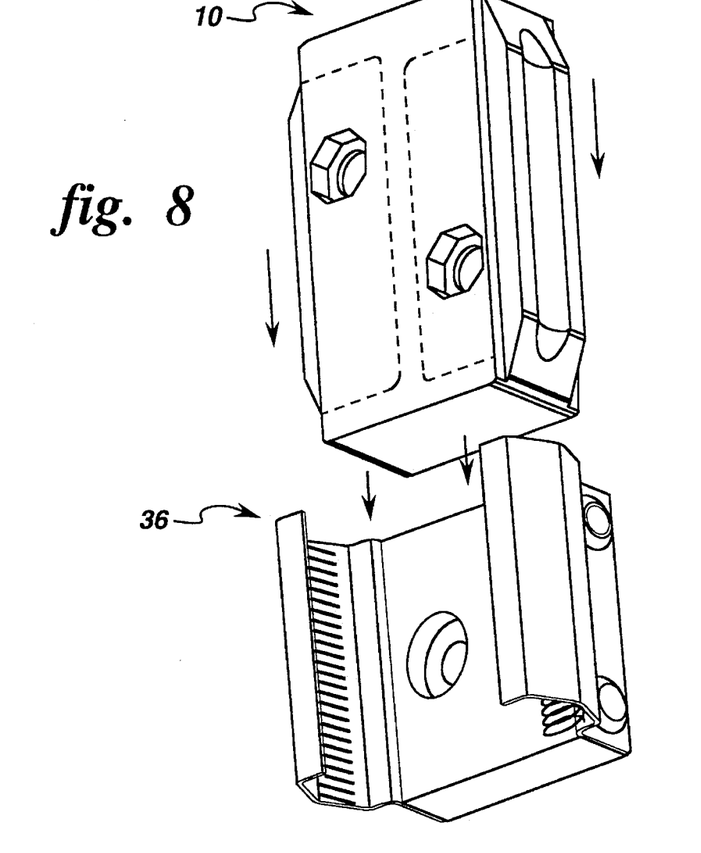
FIG. 8 is an exploded perspective view of the insertion of the connector shown in FIG. 3 into the connector receptacle shown in FIG. 5.
Figure 9:
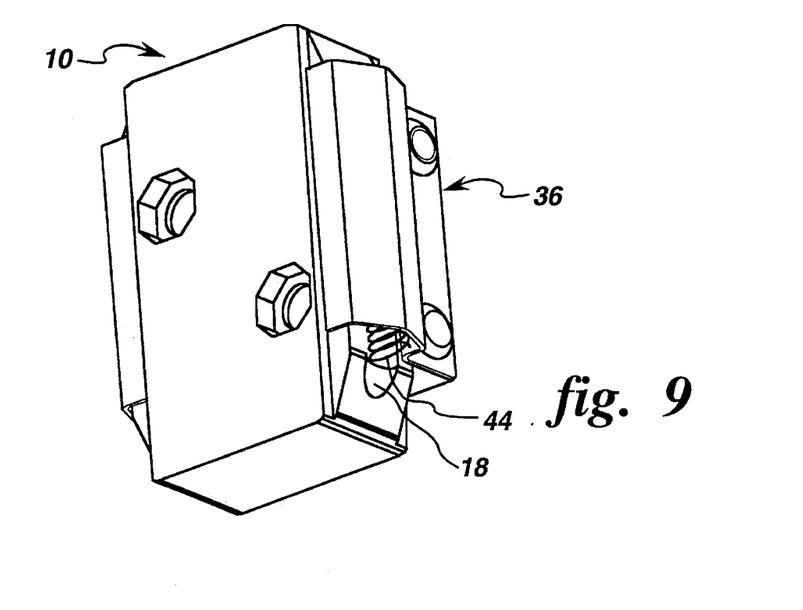
FIG. 9 is a perspective view of the connector inserted into the connector receptacle following the insertion shown in FIG. 8.

Having thus described the connector and connector receptacle according to the subject invention, FIG. 8 shows the method of insertion of the connector 10 into the connector receptacle 36, resulting in the connection assembly shown in FIG. 9. Note that the insertion is self-aligning and always provides a solid electrical connection because the flexible electrically conductive element 44 of the connector receptacle 36 flexes into the recessed portion 18 of the positive electrical contact plate of the connector 10.

Figure 10:
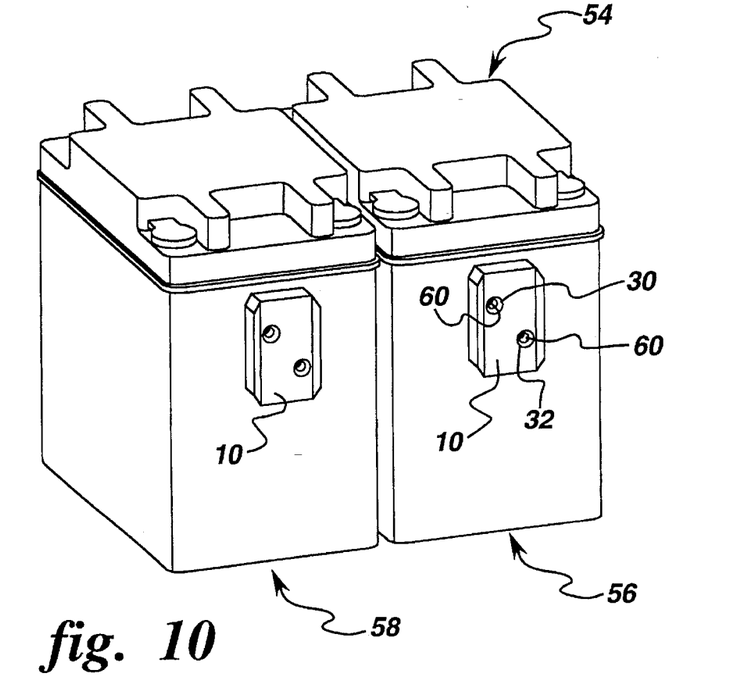
FIG. 10 is a perspective view of the connector shown in FIG. 1 mounted to a rechargeable battery.

In use, the connector 110 is mounted to a rechargeable battery power source 54. As shown in FIG. 10, the rechargeable battery 54 comprises two 12-volt batteries 56 and 58, providing a 24-volt battery pack. A connector 110 is mounted to each battery 56 and 58. A fastener device, such as a screw, is inserted into the counterbored apertures 130 or 132 in the insulator block of the connector 110, through to the battery 56 or 58. This firmly mounts the connector to the battery.

Figure 11:
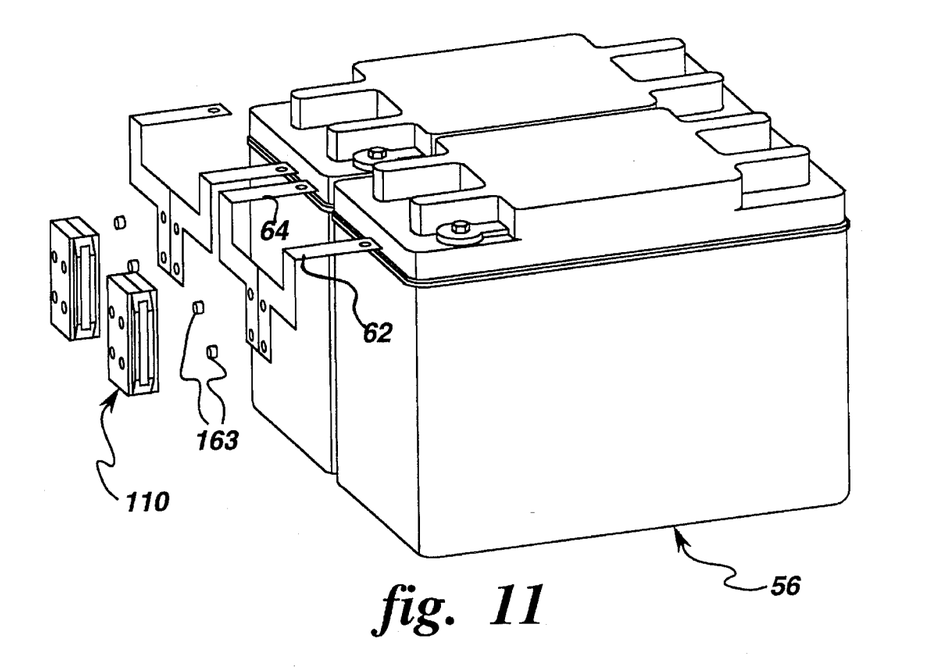
FIG. 11 is an exploded perspective view showing the actual electrical connection of the connector to the battery shown in FIG. 10.

The electrical connection of the battery 56 to the connector 110 is shown in FIG. 11. FIG. 11 shows the conductive positive tab 62 extending from the positive terminal of the battery, and the conductive negative tab 64 extending from the negative terminal of the battery. A conductive metal spacer 163 extends into the counterbored aperture 130 of the insulator block of the connector, making contact of the positive terminal with the positive electrical contact plate 118 at the plate aperture 124. The conductive negative tab 64 makes a like electrical connection to the negative electrical contact plate of the connector. Thus, when the connector is mounted to the battery, an electrical circuit is completed between the battery terminals and the corresponding positive and negative electrical contact plates of the connector.

Figure 12:
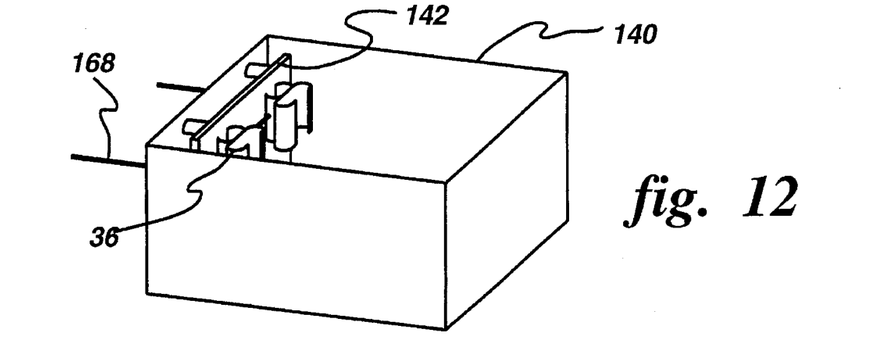
FIG. 12 is a perspective view of the connector receptacle shown in FIG. 5 mounted in a battery box.
Figure 13:
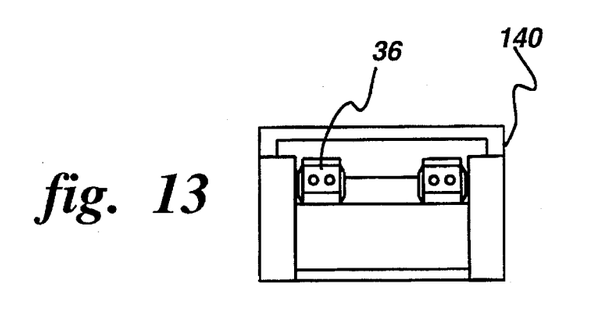
FIG. 13 is a cut-away view of the connector receptacle mounted in the battery box, as shown in FIG. 12.

Referring to FIGS. 12 and 13, the connector receptacle 36 is mounted in a battery box 140 which will be connected to a device via connection wiring 168. It should be readily apparent that various devices can utilize the connection assembly according to the subject invention to provide an easily insertable/removable rechargeable battery power source. Such devices could include, for example, trimmers, leaf blowers, snowmobiles, ATVs, and chain saws, in addition to a charger unit. The connector receptacle 36 is mounted to the battery box 140 via fastener devices, i.e. screws, inserted through the counterbored aperture of the insulator block and into the plate 142 within the battery box.

Figure 14:
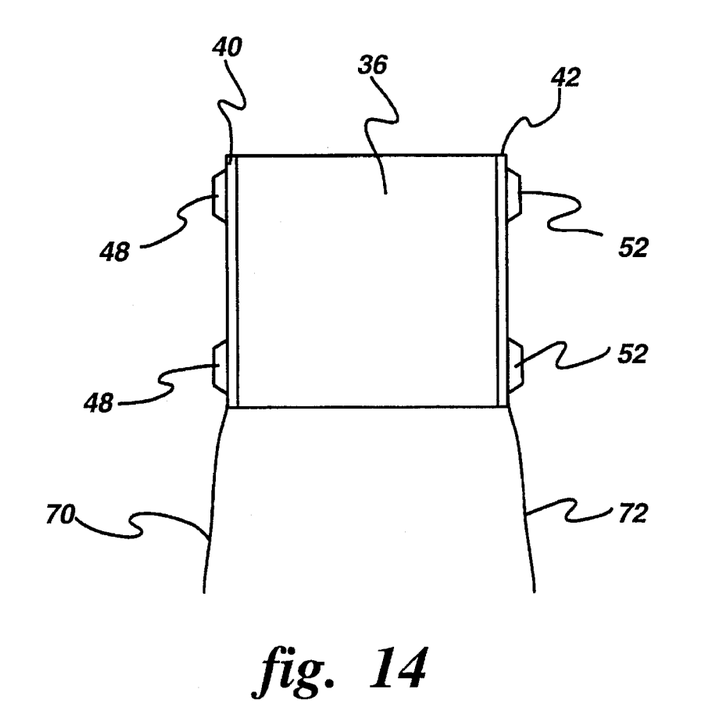
FIG. 14 is a back view of the connector receptacle shown in FIG. 12.

The electrical connection of a device, such as an appliance or a recharger unit, to the connector receptacle is shown in FIG. 14. The connector receptacle 36 includes positive and negative contacts 40 and 42, respectively, which are mounted to the insulator block via fastener devices 48 and 52. The positive wiring 70 of the device electrically connects beneath fastener device 48 to positive contact 40, while the negative wiring 72 of the device electrically connects beneath fastener device 52 to negative contact 42. Thus, when the connector receptacle is mounted to the device, an electrical circuit is completed between the lawn mower and the corresponding positive and negative contacts of the connector receptacle.

Figure 15:
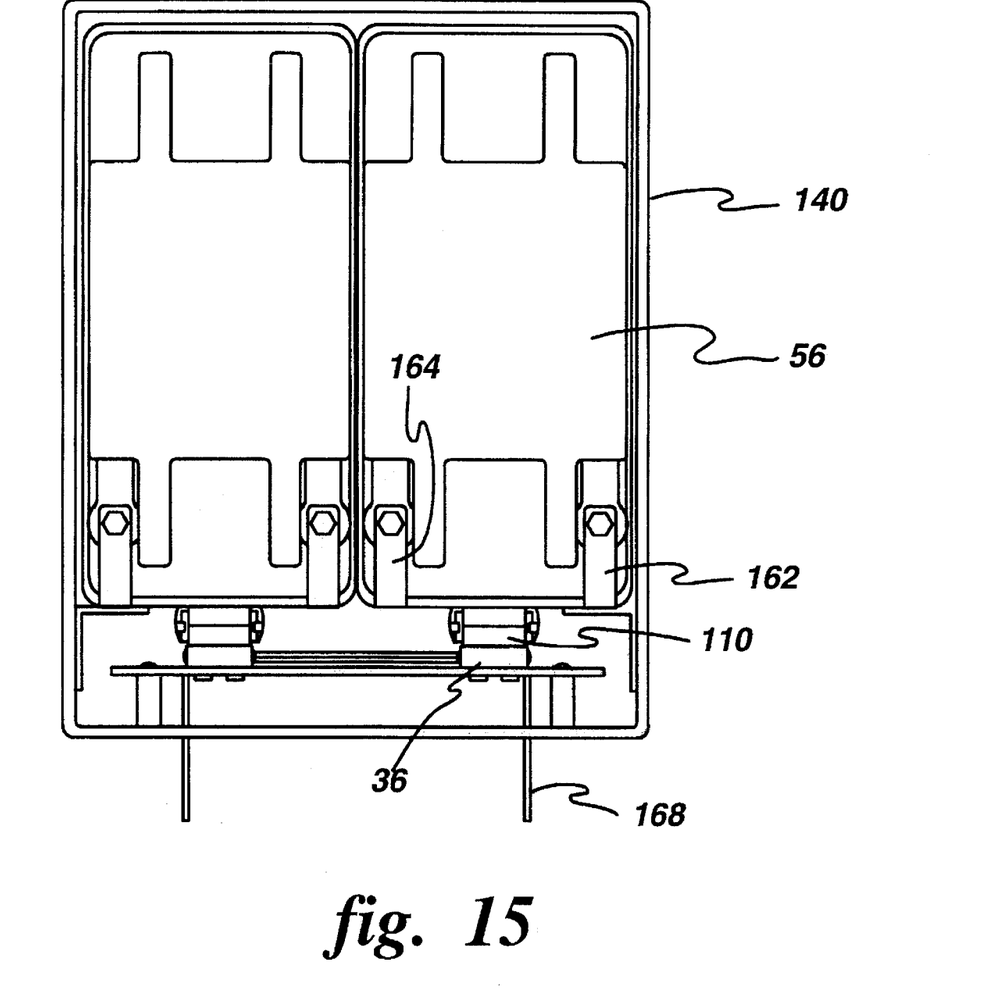
FIG. 15 is a top view of the battery, connector, connector receptacle and battery box of a device assembled according to the subject invention.
Figure 16:
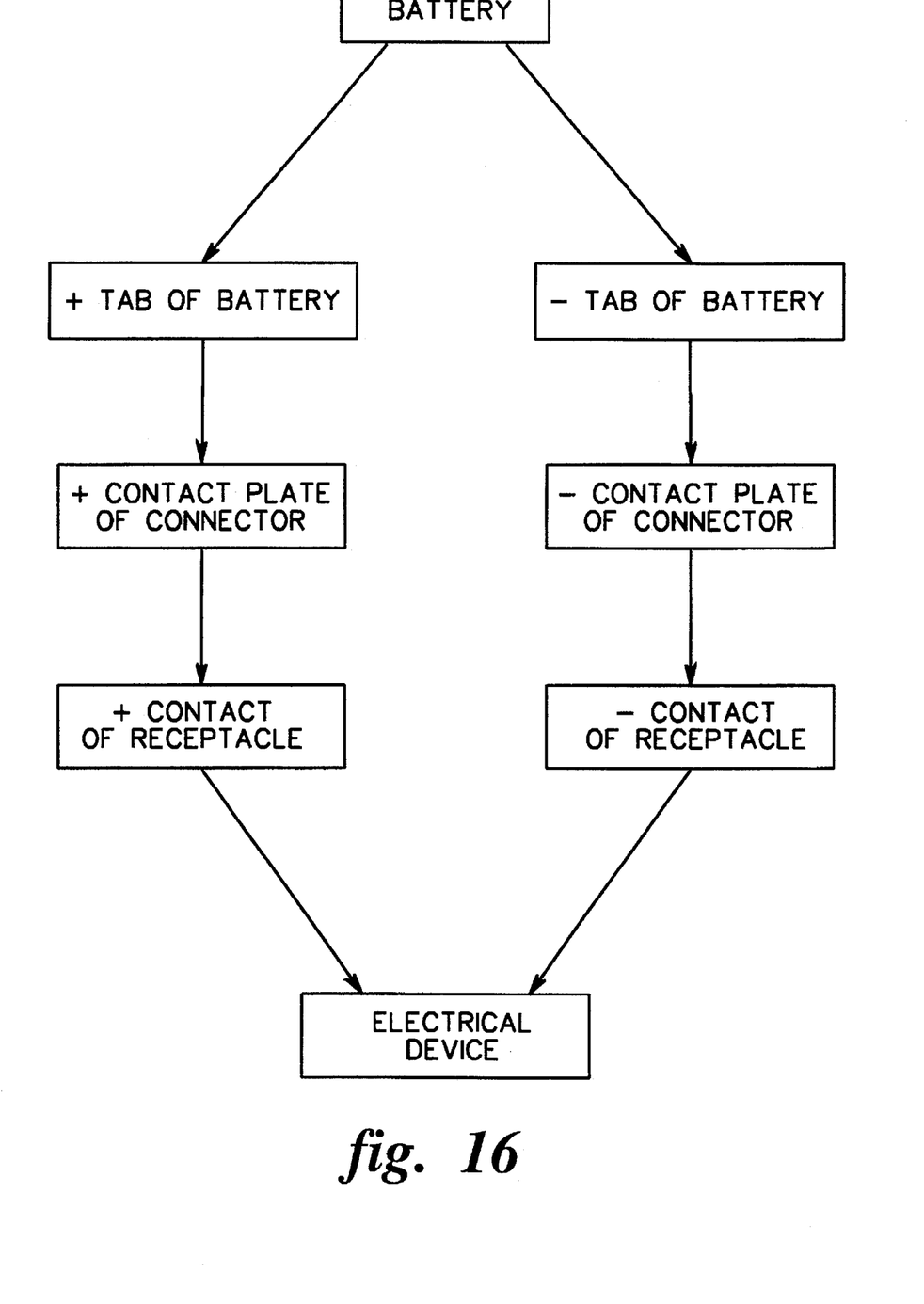
FIG. 16 is a block diagram showing the electrical connections of the assembly shown in FIG. 15.

Thus, when the battery 56 with its connector 110 is inserted into the battery box 140 with its connector receptacle 36, as shown in FIG. 15, the self-alignment of the connector 110 and the connector receptacle 36 provides an electrical connection from the battery 56 to the wiring 168. The wiring is connected to a preferred device, such as an appliance or charger unit. Preferred appliances include lawnmowers and trimmers, and other small engine appliances. FIG. 16 shows a block diagram of the electrical circuit of the entire assembly of FIG. 15. The positive tab of the battery electrically contacts the positive electrical contact plate of the connector, which electrically contacts the positive contact of the connector receptacle, which electrically contacts the positive wiring of the device. Likewise, the negative tab of the battery electrically contacts the negative electrical contact plate of the connector, which electrically contacts the negative contact of the connector receptacle, which electrically contacts the negative wiring of the device.

In order to accomplish the purpose of the subject invention, the battery utilized in the above embodiments must be easily recharged. Therefore, the invention also provides an electrical charger unit for use with the rechargeable battery. This is accomplished by electrically connecting the wiring of the battery box to the recharger unit. A battery can then easily be inserted and removed from the battery box to accomplish recharging Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined by the following claims.

What is claimed is:

1. A connection assembly for a rechargeable battery, said connection assembly comprising:
   a connector mountable to a rechargeable battery power source in electrical contact with a positive terminal and a negative terminal on the rechargeable battery power source, wherein said connector comprises:
   an insulator block;
   a positive electrical contact plate mounted in said insulator block;
   a negative electrical contact plate mounted in said insulator block in electrical isolation from said positive electrical contact plate;
   means for electrically contacting said positive electrical contact plate to the positive terminal of the rechargeable battery power source; and
   means for electrically contacting said negative electrical contact plate to the negative terminal of the rechargeable battery power source; and
   a connector receptacle mountable to an electrical device in electrical contact with the electrical device;
   wherein when said connector is placed within said connector receptacle, said connector aligns with said connector receptacle such that an electrical connection is made between the rechargeable battery power source and the electrical device.

2. The connection assembly of claim 1 wherein said positive electrical contact plate comprises a recessed area external to said insulator block.

3. The connection assembly of claim 2 wherein said recessed area of said positive electrical contact plate comprises a groove.

4. The connection assembly of claim 2 wherein said negative electrical contact plate comprises a recessed area external to said insulator block separated from said recessed area of said positive electrical contact plate.

5. The connection assembly of claim 4 wherein said recessed area of said negative electrical contact plate comprises a groove.

6. The connection assembly of claim 1 wherein said insulator block comprises a plastic block.

7. The connection assembly of claim 6 wherein said positive electrical contact plate and said negative electrical contact plate are each insert molded into said plastic block.

8. The connection assembly of claim 1 wherein said insulator block includes an aperture exposing a portion of said positive electrical contact plate within said insulator block.

9. The connection assembly of claim 8 wherein said aperture is counterbored.

10. The connection assembly of claim 1 wherein said insulator block includes an aperture exposing a portion of said negative electrical contact plate within said insulator block.

11. The connection assembly of claim 10 wherein said aperture is counterbored.

12. The connection assembly of claim 1 wherein said positive electrical contact plate and said negative electrical contact plate each comprise a metal plate.

13. The connection assembly of claim 12 wherein each said metal plate is coated with an electrically conductive material.

14. The connection assembly of claim 13 wherein said electrically conductive material comprises a beryllium copper alloy.

15. The connection assembly of claim 1 further comprising means for mounting said connector to the rechargeable battery power source, wherein the positive terminal of the rechargeable battery power source is electrically connected to said positive electrical contact plate and wherein the negative terminal of the rechargeable battery power source is electrically connected to said negative electrical contact plate.

16. The connection assembly of claim 15 wherein said insulator block includes one or more apertures through which one or more fastener devices can be inserted to connect to the rechargeable battery power source.

17. The connection assembly of claim 16 wherein said one or more apertures are counterbored.

18. The connection assembly of claim 1 wherein said connector receptacle comprises:
   a second insulator block;
   a positive contact attached to said second insulator block;
   a negative contact attached to said second insulator block apart from said positive contact;
   means for electrically contacting said positive contact to the electrical device; and
   means for electrically contacting said negative contact to the electrical device.

19. A connection assembly for a rechargeable battery, said connection assembly comprising:
   a connector mountable to a rechargeable battery power source in electrical contact with a positive terminal and a negative terminal on the rechargeable battery power source, wherein said connector comprises:
   an insulator block,
   a positive electrical contact plate mounted in said insulator block,
   a negative electrical contact plate mounted in said insulator block in electrical isolation from said positive electrical contact plate,
   means for electrically contacting said positive electrical contact plate to the positive terminal of the rechargeable battery power source, and
   means for electrically contacting said negative electrical contact plate to the negative terminal of the rechargeable battery power source,
   wherein said insulator block comprises an insulator core to which said positive electrical contact plate and said negative electrical contact plate are mounted, and further comprising an insulator housing surrounding said insulator core, wherein a portion of each of said positive electrical contact plate and said negative electrical contact plate is exposed external to said insulator housing; and a connector receptacle mountable to an electrical device in electrical contact with the electrical device;

wherein when said connector is placed within said connector receptacle, said connector aligns with said connector receptacle such that an electrical connection is made between the rechargeable battery power source and the electrical device.

20. A connection assembly for a rechargeable battery, said connection assembly comprising:

a connector mountable to a rechargeable battery power source in electrical contact with a positive terminal and a negative terminal on the rechargeable battery power source, wherein said connector comprises:
an insulator block,
a positive electrical contact plate mounted in said insulator block,
a negative electrical contact plate mounted in said insulator block in electrical isolation from said positive electrical contact plate,
means for electrically contacting said positive electrical contact plate to the positive terminal of the rechargeable battery power source, comprising an aperture in said insulator block, said aperture exposing a portion of said positive electrical contact plate within said insulator block, and wherein said aperture comprises a means for mounting said connector to the rechargeable battery power source by inserting a fastener device through said aperture to the rechargeable battery power source, and
means for electrically contacting said negative electrical contact plate to the negative terminal of the rechargeable battery power source; and a connector receptacle mountable to an electrical device in electrical contact with the electrical device;

wherein when said connector is placed within said connector receptacle, said connector aligns with said connector receptacle such that an electrical connection is made between the rechargeable battery power source and the electrical device.

21. A connection assembly for a rechargeable battery, said connection assembly comprising:

a connector mountable to a rechargeable battery power source in electrical contact with a positive terminal and a negative terminal on the rechargeable battery power source, wherein said connector comprises:
an insulator block,
a positive electrical contact plate mounted in said insulator block,
a negative electrical contact plate mounted in said insulator block in electrical isolation from said positive electrical contact plate,
means for electrically contacting said positive electrical contact plate to the positive terminal of the rechargeable battery power source, and
means for electrically contacting said negative electrical contact plate to the negative terminal of the rechargeable battery power source, comprising an aperture in said insulator block, said aperture exposing a portion of said negative electrical contact plate within said insulator block, and wherein said aperture comprises a means for mounting said connector to the rechargeable battery power source by inserting a fastener device through said aperture to the rechargeable battery power source; and a connector receptacle mountable to an electrical device in electrical contact with the electrical device;

wherein when said connector is placed within said connector receptacle, said connector aligns with said connector receptacle such that an electrical connection is made between the rechargeable battery power source and the electrical device.

22. A connection assembly for a rechargeable battery, said connection assembly comprising:

a connector mountable to a rechargeable battery power source in electrical contact with a positive terminal and a negative terminal on the rechargeable battery power source; and a connector receptacle mountable to an electrical device in electrical contact with the electrical device, wherein said connector receptacle comprises:
an insulator block;
a positive contact attached to said insulator block;
a negative contact attached to said insulator block apart from said positive contact;
means for electrically contacting said positive contact to the electrical device; and
means for electrically contacting said negative contact to the electrical device;

wherein when said connector is placed within said connector receptacle, said connector aligns with said connector receptacle such that an electrical connection is made between the rechargeable battery power source and the electrical device.

23. The connection assembly of claim 22 wherein said insulator block comprises a plastic block.

24. The connection assembly of claim 22 further comprising means for mounting said connector receptacle to the electrical device, wherein the electrical device is electrically connected to said positive contact and said negative contact.

25. The connection assembly of claim 24, wherein said insulator block comprises one or more apertures, and wherein said means for mounting said connector receptacle comprises one or more fastener devices for inserting into said one or more apertures and connecting to the electrical device.

26. The connection assembly of claim 25 wherein said one or more apertures are counterbored.

27. A connection assembly for a rechargeable battery, said connection assembly comprising:

a connector mountable to a rechargeable battery power source in electrical contact with a positive terminal and a negative terminal on a rechargeable battery power source; and a connector receptacle mountable to an electrical device in electrical contact with the electrical device, wherein said connector receptacle comprises:
an insulator block,
a positive contact attached to said insulator block,
a negative contact attached to said insulator block apart from said positive contact,
means for electrically contacting said positive contact to the electrical device, and
means for electrically contacting said negative contact to the electrical device;

wherein each of said positive contact and said negative contact comprises a flexible electrically conductive element mounted within an electrically conductive element retainer, said element retainer mounted to said insulator block and said flexible electrically conductive element being capable of electrically contacting said connector, and wherein when said connector is placed within said connector receptacle, said connector aligns with said connector receptacle such that an electrical connection is made between the rechargeable battery power source and the electrical device.

28. The connection assembly of claim 27 wherein said flexible electrically conductive element comprises a flexible metal spring.

29. The connection assembly of claim 28 wherein said flexible metal spring comprises a canted coil spring.

30. The connection assembly of claim 28 wherein said flexible metal spring is soldered into said element retainer.

31. The connection assembly of claim 28 wherein said flexible metal spring is crimped into said element retainer.

32. The connection assembly of claim 27 wherein said element retainer comprises a metal.

33. The connection assembly of claim 27 wherein said element retainer is mounted to said insulator block by a conductive fastener.

34. The connection assembly of claim 27 wherein said element retainer includes an aperture, wherein said means for electrically contacting said positive contact comprises a conductive fastener inserted through the aperture and into said insulator block, and wherein said electrical device contacts said conductive fastener, said conductive fastener providing an electrical connection between said positive contact and said electrical device.

35. The connection assembly of claim 27 wherein said element retainer includes an aperture, wherein said means for electrically contacting said negative contact comprises a conductive fastener inserted through the aperture and into said insulator block, and wherein said electrical device contacts said conductive fastener, said conductive fastener providing an electrical connection between said negative contact and said electrical device.

36. A rechargeable battery assembly comprising:
a rechargeable battery having a positive terminal and a negative terminal;
a connector mounted to said rechargeable battery in electrical contact with said positive terminal and said negative terminal, wherein said connector comprises:
an insulator block;
a positive electrical contact plate mounted in said insulator block;
a negative electrical contact plate mounted in said insulator block in electrical isolation from said positive electrical contact plate;
means for electrically contacting said positive electrical contact plate to the positive terminal of said rechargeable battery; and
means for electrically contacting said negative electrical contact plate to the negative terminal of said rechargeable battery;
an electrical device into which said rechargeable battery is to be inserted; and
a connector receptacle mounted to said electrical device in electrical contact with said electrical device, said connector removably inserted into said connector receptacle;
wherein when said connector is removably inserted into said connector receptacle, said connector aligns with said connector receptacle to complete an electrical connection between said rechargeable battery and said electrical device.

37. The rechargeable battery assembly of claim 36, wherein said insulator block includes one or more apertures, said rechargeable battery assembly further comprising one or more fastener devices that can be inserted through the one or more apertures and contact said rechargeable battery.

38. The rechargeable battery assembly of claim 37 wherein said one or more apertures are counterbord.

39. The rechargeable battery assembly of claim 36 further comprising a positive tab extending from said positive terminal of said rechargeable battery and a negative tab extending from said negative terminal of said rechargeable battery.

40. The rechargeable battery assembly of claim 39, wherein said insulator block includes an aperture, and wherein said means for electrically contacting said positive electrical contact plate comprises a portion of said positive electrical contact plate within said insulator block exposed by the aperture.

41. The rechargeable battery assembly of claim 40 wherein said positive tab is connected to a conductive metal spacer that extends into said aperture and electrically contacts said positive electrical contact plate.

42. The rechargeable battery assembly of claim 39, wherein said insulator block includes an aperture, and wherein said means for electrically contacting said negative electrical contact plate comprises a portion of said negative electrical contact plate within said insulator block exposed by the aperture.

43. The rechargeable battery assembly of claim 42 wherein said negative tab is connected to a conductive metal spacer that extends into said aperture and electrically contacts said negative electrical contact plate.

44. The rechargeable battery assembly of claim 38 wherein said connector receptacle comprises:
a second insulator block;
a positive contact attached to said second insulator block;
a negative contact attached to said second insulator block apart from said positive contact;
means for electrically contacting said positive contact to said electrical device; and
means for electrically contacting said negative contact to said electrical device;
wherein when said connector is placed within said connector receptacle, said positive electrical contact plate aligns with said positive contact and said negative contact plate aligns with said negative contact to complete an electrical connection between said rechargeable battery and said electrical device.

45. A rechargeable battery assembly comprising:
a rechargeable battery having a positive terminal and a negative terminal;
a connector mounted to said rechargeable battery in electrical contact with said positive terminal and said negative terminal;
an electrical device into which said rechargeable battery is to be inserted; and
a connector receptacle mounted to said electrical device in electrical contact with said electrical device, said connector removably inserted into said connector receptacle, wherein said connector receptacle comprises:
an insulator block;
a positive contact attached to said insulator block;
a negative contact attached to said insulator block apart from said positive contact;
means for electrically contacting said positive contact to said electrical device; and means for electrically contacting said negative contact to said electrical device;

wherein when said connector is removably inserted into said connector receptacle, said connector aligns with said connector receptacle to complete an electrical connection between said rechargeable battery and said electrical device.

46. The rechargeable battery assembly of claim 45, wherein said insulator block includes one or more apertures, said rechargeable battery assembly further comprising one or more fastener devices that can be inserted through the one or more apertures to contact said electrical device.

47. The rechargeable battery assembly of claim 46 wherein said one or more apertures are counterbored.

48. The rechargeable battery assembly of claim 45 wherein said electrical device comprises an appliance to be powered by said rechargeable battery.

49. The rechargeable battery assembly of claim 48 wherein said appliance comprises wheels.

50. The rechargeable battery assembly of claim 49 wherein said appliance comprises a lawn mower.

51. The rechargeable battery assembly of claim 45 wherein said electrical device comprises a recharger unit for recharging said rechargeable battery.

* * * * *